United States Patent [19]
Leshem

[11] 3,818,786
[45] June 25, 1974

[54] REMOTE CUTTING APPARATUS
[75] Inventor: Adam Leshem, Bloomfield, Conn.
[73] Assignee: Combustion Engineering, Inc., Windsor, Conn.
[22] Filed: Dec. 21, 1972
[21] Appl. No.: 317,485

[52] U.S. Cl. .................................... 82/70.2, 82/4 C
[51] Int. Cl. .......................... B23b 3/04, B23b 3/22
[58] Field of Search ............ 82/4, 4.3, 70.2, 71, 72, 82/73, 74, 75, 76, 77, 46, 48, 101, 20; 29/DIG. 78

[56] References Cited
UNITED STATES PATENTS

| | | | |
|---|---|---|---|
| 1,526,950 | 2/1925 | Bartley | 82/4 R |
| 1,962,641 | 6/1934 | Fowzer | 82/4 R |
| 3,196,718 | 7/1965 | Herman | 82/20 |
| 3,324,749 | 6/1967 | Guyon | 82/4 C |
| 3,385,148 | 5/1968 | DiPiazza | 82/70.2 |
| 3,533,318 | 10/1970 | Bonnet et al. | 82/70.2 |

Primary Examiner—Harrison L. Hinson
Attorney, Agent, or Firm—Stephen A. Schneeberger

[57] ABSTRACT

Apparatus is described for making an annular cut in a remote surface. The apparatus is particularly suited for use in cutting the weld of an omega seal between two elongated pressure members in a nuclear reactor. The apparatus is capable of substantially aligning itself in a cutting orientation and maintaining itself therein against dislodging forces. A cutting tool is adapted to be remotely driven into cutting engagement with the weld. Cleansing means are provided for preventing cutting chips from entering the void defined by the omega seal and for removing them from the cutting region.

6 Claims, 6 Drawing Figures

REMOTE CUTTING APPARATUS

BACKGROUND OF THE INVENTION

The invention relates generally to cutting apparatus. More particularly, the invention relates to a device for making circular cuts in transversely extending surfaces of elongated structures.

A large variety of cutting machines have evolved to satisfy various cutting requirements. In certain instances, it may be necessary to make a cut into or through a transversely extending surface of an elongated structure. A typical example of this is the requirement to cut through the annular seal weld between two members making up the elongated pressure housing for a control element in a nuclear reactor. Typically, such housing is circular in cross section, is vertically extending and includes a first lower member and a second upper member of lesser diameter than the first. The upper member is joined to the lower member in a manner which creates a radially or transversely extending surface between them at their point of juncture and in this transversely extending surface there is typically provided an omega seal requiring an annular weld to effect the final seal.

From time to time it may be necessary to separate the upper member from the lower member, as for repair of the control element or some portion of its drive train. At such time the annular seal weld must be cut to permit separation of the members. A typical reactor will include large numbers of such pressure housings in close proximity to one another; thus making it difficult, if not impossible, for an operator to work in situ with the region to be cut. Further, the operator may be prevented from operating in such an area by the presence of radiation.

In order to effect the necessary cut, at least one device has been developed which permits cutting of the seal weld from a remote position. This device comprises a cutting tool positioned on the lower end of an elongated rotating sleeve which extends upwardly about the pressure housing to a motor for drivingly rotating the sleeve. The cutting tool is advanced into the region of intended cut by manually feeding the rotating sleeve in such direction. While such a cutting device is capable of providing the necessary annular cut, its use of a cutter housing and rotating elements which extend at least the full length of the pressure housing upper member results in a piece of equipment which is both massive and expensive. Further, the use of manually controlled means to feed the cutting tool gives rise to the potential for error and the imprecision attendant to manual control, particularly over a long transmission path. While such features might be tolerated where the length of the pressure housing's upper member is only several feet, this length may be as great as 10–15 feet on a present day nuclear reactor used by utilities.

SUMMARY OF THE INVENTION

According to the invention, there is provided an apparatus for remotely making annular cuts in an elongated structure having an outwardly enlarged portion and wherein an operator is necessarily displaced from the region to be cut by a substantial distance. While being generally applicable to making annular cuts and related functions in or near the enlarged portion of an elongated member, it is particularly adapted for use in cutting the omega seal welds in the radially or horizontally extending surface at the junction between the upper and lower, or motor, housings for a nuclear control element and its associated drive mechanism.

The cutting apparatus of the invention includes a housing constructed to slidably encircle the elongated structure for movement therealong toward an outwardly enlarged portion thereof and to align itself in a predetermined operating position proximate the region of the intended cut; means for maintaining the housing in the predetermined positioning; a sleeve supported by the housing in relative rotational relationship therewith and against longitudinal motion relative thereto and adapted to encircle the elongated structure; remotely controlled driving means for rotating the sleeve relative to the housing; cutting means; movable means supporting the cutting means on the rotating sleeve in cutting alignment with the region of intended cut when the housing is at its operating position for movement relative to the rotating sleeve into cutting engagement with the structure; and means for moving the cutting means into cutting engagement with the elongated structure.

The housing of the apparatus may include an inner sleeve sized longitudinally such that it positions the housing in a predetermined axial location from which the cutting operation is conducted. Means carried by the housing, and possibly comprising a portion thereof, are positioned to radially closely embrace said elongated member to radially position the cutting apparatus. Further, the housing of the cutting apparatus may be maintained in its operating position by remotely operated gripping means.

A rotating sleeve adapted to encircle the elongated structure is supported by the housing in rotational relationship therewith. The sleeve may be rotated by means of a motor mounted on the housing and in driving engagement therewith. The cutting means is preferably supported in threaded engagement with a feed gear which is in turn rotatably supported by the rotating sleeve. A ring gear affixed to the non-rotating housing is drivingly connected, through a gear train, with the feed gear which supports the cutting means. This arrangement serves to feed the cutting means into and out of cutting engagement with the elongated structure at a rate controlled by the rotation of the rotating sleeve. The above-mentioned systems for driving the rotating sleeve and the feed gear supporting the cutting means may each comprise a planetary gear train if either reduction or increase in speed is required.

Means including limit switches or hard stops are provided for sensing when the tool and tool holder have arrived at a predetermined limit position, such that appropriate action may be taken.

Means are provided for cleansing cutting chips from the cut area. One such means provides ports at various locations around the housing for establishing a flow of fluid, such as air, across the cut region. Another means utilizes a jet of air directed into most of the circumference of the cut to prevent chips from entering the cut and seal void or chamber at that portion of the circumference which includes the cutting tool and an exiting flow of air.

DESCRIPTION OF THE PREFERRED EMBODIMENT

The cutting apparatus of the invention as described hereinafter in the preferred embodiment is utilized to cut and machine the seal welds in elongated housings on nuclear reactors. It will be appreciated, however, that such apparatus would be equally suited to performing similar cutting and machining operations at some region displaced from the operator along an elongated structure and including an outwardly expanded portion against which the apparatus may position itself.

Figure 1:
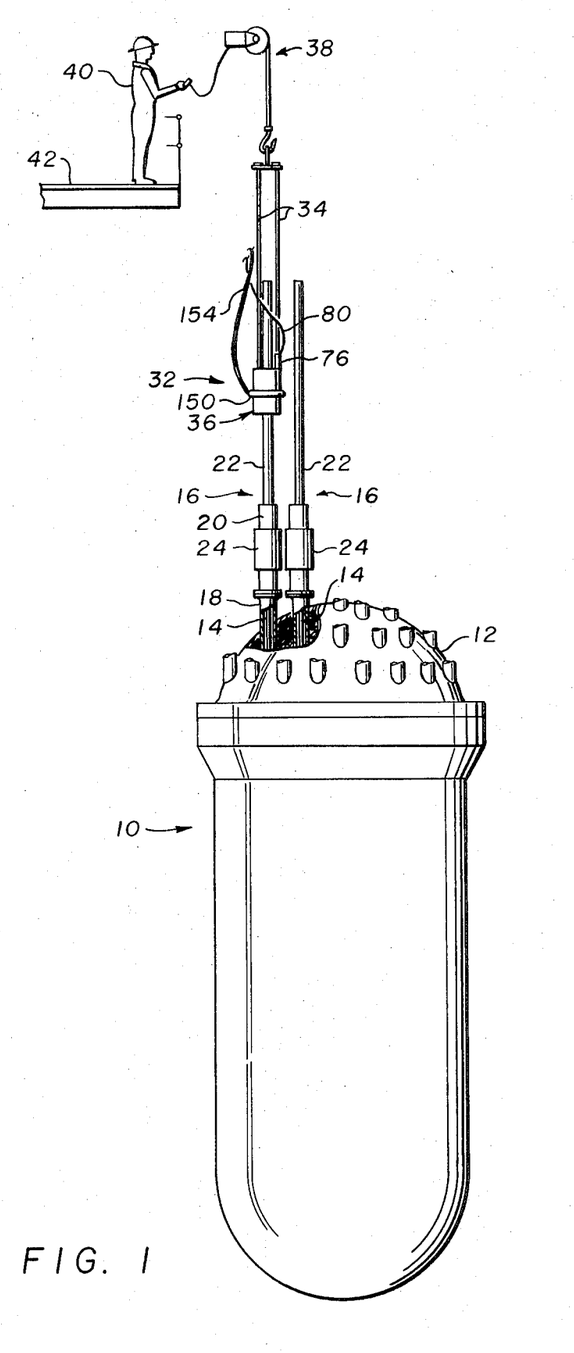
FIG. 1 is an elevational view of the cutting apparatus of the invention during installation about a control rod housing on a nuclear reactor, parts being shown cut away or in section for clarity.

Referring now to FIG. 1, there is shown a nuclear reactor vessel 10 including an upper domed head portion 12 secured thereto. A large number of control element drive mechanisms for driving control element drive shafts 14 are individually housed in and about pressure housings 16. Typically, each pressure housing 16 includes a tubular reactor nozzle portion 18 extending upwardly from the reactor head 12, a tubular motor housing portion 20 affixed to and extending upwardly from the nozzle portion 18, and an elongated tubular upper pressure housing 22 affixed to and extending upwardly from motor housing 20. The driving power for control element drive shafts 14 is provided by the coils 24 of a magnetic jacking assembly mounted on and within motor housing 20. Upper pressure housing 22 exists principally to house the drive shaft 14 of a control element assembly when such assembly is in its withdrawn position. Upper housing 22 typically extends 12 feet above motor housing 20. Upper housing 22 is of smaller outside diameter than motor housing 20 along substantially its entire length and is joined to the motor housing principally by means of threaded engagement therewith, seen more clearly in FIG. 2. The lower end of upper housing 22 includes a flange portion 26 extending radially outward therefrom and having threads along its outer periphery. Correspondingly, motor housing 20 is threaded near its upper end about its inner circumference.

In order to accommodate the thermal expansionary effects on housings 20 and 22 during operation of the reactor, the juncture between these two housing components further includes an annular omega seal 28 near the uppermost end of motor housing 20. Omega seal 28 is formed by abutting annular, concave recesses in the outer periphery of flange 26 and the inner periphery of motor housing 20 to define an annular void or chamber. The axially thin annular fingers formed by omega seal 28 on the uppermost end of housing 20 and the upper portion of flange 26 of housing 22 are joined by an annular seal weld 30 to maintain the pressure-tight integrity of the overall housing.

As may be evident from FIG. 1, the large number of control element drive mechanisms present on head 12 require the pressure housing 16 to be positioned laterally in rather close proximity to one another. Typically, housings 16 may be as close to one another as 11 ½ inches from center to center. The outer diameter of the coils 24 is such that adjoining coils may be quite close to one another at some places. The outer diameter of motor housing 20 in the region of its juncture with housing 22 is typically 6 ½ inches and that of upper housing 22 is typically 2 ½ inches. It is thus evident that relatively little space exists between adjacent housings 16, thereby precluding an operator from working locally in the region and further placing strigent size restrictions on any remotely controlled machines operating in the area.

As seen in FIG. 1, the cutting machine 32 of the invention is sized and adapted to slidably encircle upper pressure housing 22. Support means, such as rods 34, are affixed to the housing 36 of machine 32. Rods 34 are of sufficient length to allow housing 36 to be lowered about upper housings 22 into supported engagement with motor housing 20 in a manner to become hereinafter evident. Rods 34 may be replaced by a single tubular member in coaxial relationship with housing 36 or possibly a plurality of flexible cables. Support rods 34 are in turn supported at their upper end by a winch and cable arrangement 38 for controllably raising and lowering cutting machine 32. An operator 40, stationed above nuclear vessel 10 on refueling platform 42 may control the raising and lowering of machine 32. Cutting machine 32 will now be described in greater detail.

Figure 2:
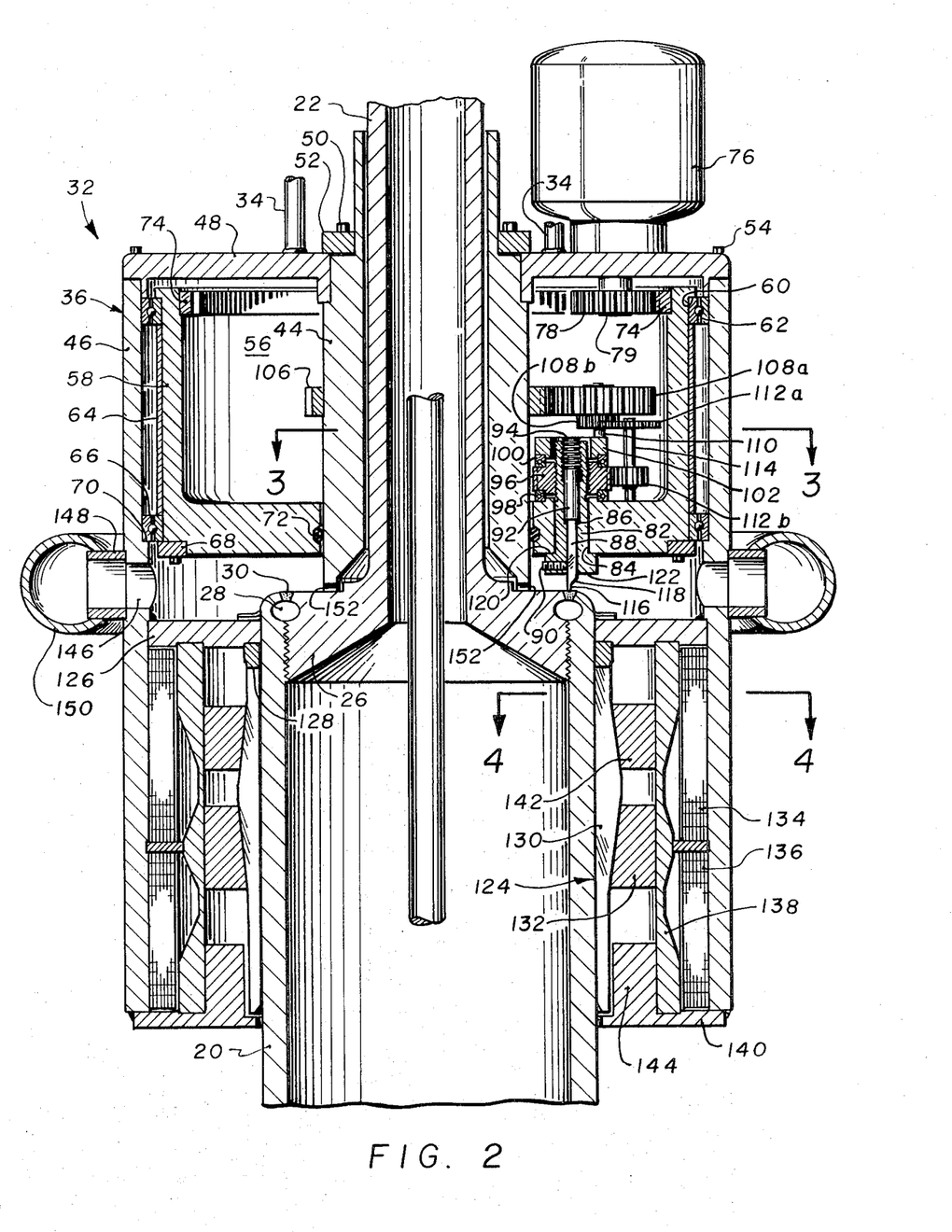
FIG. 2 is an elevational view, in section, of the cutting apparatus positioned for cutting, and taken along the axis of the control rod housing.

Referring to FIG. 2, cutting machine 32 is seen in its operational positioning on and about housings 20 and 22. The view of FIG. 2 is taken on a plane along the axis of pressure housings 20 and 22. Housing 36 of machine 32 is typically of a metal such as stainless steel and is comprised of a cylindrical inner or locating sleeve 44, a cylindrical outer sleeve 46 and a ring or washer like upper end plate 48 extending between and connecting sleeves 44 and 46 in concentrically spaced relationship. The inner diameter of locating sleeve 44 is somewhat greater than that of the outer diameter of upper pressure housing 22, for instance ⅛ inch. This allows locating sleeve 44 to slidably encircle housing 22.

Upper end plate 48 is a substantially flat annular member having an inner diameter which is somewhat larger than the inner diameter of locating sleeve 44 and, in this embodiment, is adapted to encircle locating sleeve 44 and be joined in axially and radially supported relationship therewith as by bolt 50 and collar 52. Cylindrical outer sleeve 46 is affixed to end plate 48 as by threaded engagement with bolt 54 in plate 48 and extends vertically downward therefrom near the outer circumference of the end plate. The diameter of end plate 48 and the radial positioning of outer sleeve 46 relative thereto are such that the inner diameter of outer sleeve 46 is radially spaced approximately 4 inches from the outside diameter of motor housing 20 near its upper end. The outside diameter of outer sleeve 46 may be about 11 ½ inches.

The locating sleeve 44 is at least several inches in length and its lower end face serves to axially contact the transversely or radially extending upper surface of flange 26 on upper pressure housing 22. Thus, locating sleeve 44, and accordingly the machine housing 36 of which it is rigidly a part, are limited in axial downward movement relative to pressure housing 16 and more particularly seal weld 30 therein. Transversely or radially extending upper end plate 48 joins sleeve 44 a sufficient distance above the lower end surface of sleeve 44 to create an annular chamber 56 about sleeve 44. Outer sleeve 46 extends from end plate 48 downwardly beyond the lower end of locating sleeve 44 as much as several inches to create an annular region between motor housing 20 and outer sleeve 46 when locating sleeve 44 axially contacts flange 26. Radial positioning and gripping means, to be described later in greater detail, occupy this latter mentioned annular region.

A cup-shaped sleeve 58 encircles locating sleeve 44 and is supported in relative rotational relationship therewith within annular chamber 56. Rotating sleeve 58 comprises a vertically extending cylindrical portion having a diameter somewhat less than that of outer sleeve 46 and further including a radially inwardly extending annular base portion affixed to or integrally molded as part of the lower end of said vertically extending cylindrical portion.

An outwardly extending flange near the upper end of rotating sleeve 58 creates an annular downwardly facing land 60 which serves as the upper contact surface for the inner race of a bearing 62 which closely encircles and engages the outer diameter of rotating sleeve 58. A thin cylindrical spacer 64 closely encircles rotating sleeve 58 and extends from the lower surface of the inner race of bearing 62 downwardly to the upper surface of the inner race of bearing 66 which closely encircles and engages rotating sleeve 58 near its lower end. The inner races of bearings 66 and 62 are compressionally loaded against land 60 by means of an annular collar 68 joined, as by bolting, to the lower end of rotating sleeve 58 and acting upwardly against the lower surface of the inner race of bearing 66.

The outer races of bearings 62 and 66 snugly contact the inner circumference of outer sleeve 46. The outer race of bearing 66 is upwardly supported by an inwardly extending annular land 70 formed in the inner wall of outer sleeve 46 at a longitudinal position somewhat above the lower end face of locating sleeve 44. The outer race of bearing 62 is downwardly supported by a downwardly facing surface of upper end plate 48 compressionally in contact with the upper surface of said race.

Bearings 62 and 66 and their respective supporting or mounting arrangements serve to axially or longitudinally fixedly position rotating sleeve 58 relative to machine housing 36 and more particularly locating sleeve 44. The radial positioning of rotating sleeve 58 to machine housing 36 is also generally provided and maintained by bearings 62 and 66 with further assistance being provided by an annular sealing member such as felt seal 72. The base portion of rotating sleeve 58 extends radially inwardly to a point near but spaced from the outer diameter of locating sleeve 44 thereat. Seal 72, which may be any resilient, relatively low friction material is mounted in an annular recess in the radially inwardly facing surface of the base of rotating sleeve 58 and pressingly contacts the outer circumference of locating sleeve 44. Seal 72 thus serves to apply a radially outward force against rotating sleeve 58.

A ring gear 74 having inwardly extending teeth is prefitted into snug engagement with the inner circumference of rotating sleeve 58 near its upper end. Gear 78 is affixed to shaft 79 which, in turn, extends downwardly from end plate 48 and is mounted therein for rotation about its axis. As depicted in the preferred embodiment, gear 78 is shown in driving engagement with the teeth of ring gear 74. It will be appreciated, however, that gear 78 might be only the first or sun gear in a planetary gear train ultimately driving the ring gear 74 if speed reduction or increase is required.

Gear 78 is drivingly connected to a source of driving power, such as motor 76. Motor 76 is fixedly mounted to the upper surface of upper end plate 48 and is electrically controlled and powered through cable 80, seen in FIG. 1, extending upwardly toward operator 40. Gear shaft 79 is connected with the drive shaft of motor 76 through any of a variety of well known means. It may be desirable, for reasons to become hereinafter evident, to include a clutch in the drive train between motor 76 and shaft 79 which slips at and above a predetermined torque. Motor 76 is any of a variety of small, relatively low horsepower reversible electric motors operating at a speed of several hundred rpm. The speed of motor 76 and the gear ratios of gears 78 and 74 are such, in the preferred embodiment, that rotating sleeve 58 rotates relative to housing 36 at 30 rpm.

When locating sleeve 44 is axially contacting flange 26 of pressure housing 16, the size and positioning of rotating sleeve 58 within machine housing 36 is such that the base portion of the rotating sleeve is spaced above the upper surface of flange 26 somewhat. A tool holder 82 is slidably movable in close fitting relationship within a guideway 84 extending vertically through the base portion of rotating sleeve 58. Tool holder 82 is of greater length than the vertical thickness of the base portion of rotating sleeve 58 for reasons to later become evident. The cross-sectional geometry of guideway 84 and the lower portion of tool holder 82 are such, for instance square, as to prevent relative rotation therebetween. Tool holder 82 has an opening 86 extending vertically therethrough and disposed laterally centrally thereof. The lower portion of opening 86 is sized to closely surround the upper portion of cutting tool 88 mounted therein. The opening 86 and the surrounded portion of cutting tool 88 are cross-sectionally configured to prevent relative rotational motion therebetween. Cutting tool 88 is prevented from dropping out of opening 82 by means of a set or locking screw 90. Upward movement of cutting tool 88 during the cutting operation is prevented by a plug 92 slidably inserted into opening 86 at the top and held in place by set screw 94 in opening 86 in the upper end of tool holder 82.

The radial positioning of guideway 84, tool holder 82 and accordingly cutting tool 88 are chosen such that the cutting tool will have the same radius relative to the vertical axis of housing 22 as seal weld 30.

Tool holder 82 is circular in cross-section along a longitudinally extending portion of its upper end and is exteriorly threaded therealong. An annular feed gear 96 having teeth about its outer periphery and being threaded along a longitudinally extending part of its inner periphery is disposed about the upper portion of tool holder 82 in threaded engagement therewith. Gear 96 is supported for rotation about an axis extending vertically through the center of tool holder 82 on bearings 98 and 100. Bearing 100 rests on an upper surface of gear 96. Bearings 98 are positioned intermediate the base portion of rotating sleeve 58 and the under surface of gear 96 and bearing 100 is positioned intermediate the upper surface of gear 96 and the under surface of clamp 102. Bearings 98 and 100 encircle tool holder 82 and upwardly and downwardly extending land portions of the rotating sleeve base portion, gear 96 and clamp 102 which laterally or radially position the bearings. Clamp 102 is a generally annular member encircling tool holder 82 in spaced relationship therewith above gear 96 and including downwardly and outwardly extending mounting flanges 104, seen in FIG. 3, for fixedly positioning the clamp as by bolting to the base of the rotating sleeve. Clamp 102 preloads gear 96 with a downward force which is opposed by the base portion of rotating sleeve 58. When gear 96 is rotated, tool holder 82 and accordingly cutting tool 88, will be moved or fed vertically either upward or downward depending on the direction of rotation of the gear.

Rotation of gear 96 is effected by means of a gear train drivingly connected therewith and originating with a ring gear 106. Ring gear 106 encircles the outer circumference of locating sleeve 44 in prefitted nonmoving relationship therewith. While ring gear 106 might, in certain instances, be positioned to drive feed gear 96 directly, in this embodiment it is positioned longitudinally along locating sleeve 44 such that it is above gear 96 and clamp 102. This allows a planetary gear train to be interposed therebetween. Such a planetary gear train may be used, as mentioned earlier, for increasing or decreasing the ratio of the final driven gear to the initial driving gear. In the preferred embodiment of the invention, tool holder 82 and cutting tool 88 are fed toward or away from weld 30 at a rate of 0.001 inch per revolution of sleeve 58. This feed rate may be obtained through a proper scaling of both the gear ratios and the pitch of the feed threads on tool holder 82, as is well known in the art. In the instance that reduction is needed intermediate ring gear 106 and feed gear 96, a planetary gear train may be used.

Figure 3:
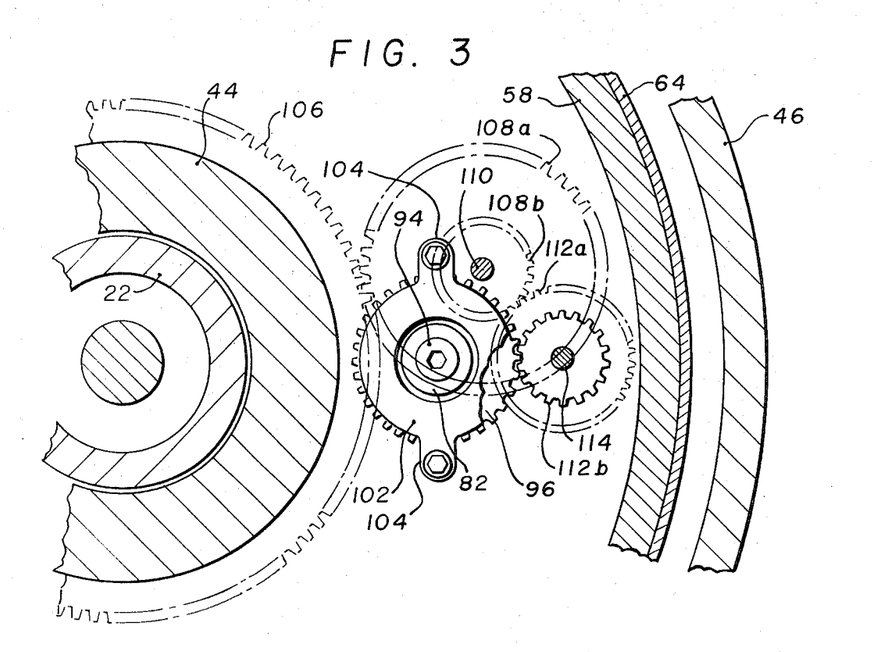
FIG. 3 is a plan view of the cutting tool holder and its drive mechanism as taken along line 3—3 of FIG. 2, parts of the drive mechanism above the line 3—3 being shown in phantom.

For purposes of example in this application there appears a planetary gear system comprising a major gear 108a and a minor gear 108b concentrically mounted on shaft 110 which is in turn supported by the base portion of rotating sleeve 58 and a major gear 112a and a minor gear 112b concentrically mounted on shaft 114 in turn also supported by the rotating sleeve base portion. In both instances the minor gear is mounted such that it rotates with its corresponding major gear relative to rotating sleeve 58, whether or not they rotate relative to their supporting shafts. The lengths of shafts 110 and 114 and the placement of their respective major and minor gears longitudinally therealong, and further the lateral mounting location of the shafts on the base portion of rotating sleeve 58 are easily accommodated within annular chamber 56 as seen in FIGS. 2 and 3. Major gear 108a is in driven engagement with ring gear 106 and its associated minor gear 108b appears immediately thereunder in driving relationship with major gear 112a which in turn drivingly rotates its minor gear 112b which is in driving engagement with the teeth of feed gear 96.

Cutting tool 88 is provided with a cutting edge 116 and a chamfering edge 118. The cutting edge 116 makes a cut through the weld normal to the surface containing the weld when tool holder 82 is advanced normal to said surface and the chamfering edge 118 is positioned on cutting tool 88 such that it chamfers the edge of motor housing 20 following the cut thereat when tool holder 82 is advanced further into the cut region.

Cutting machine 32 is provided with means for sensing a "fully withdrawn" or "starting" reference position for tool holder 82 and associated cutting tool 88 and means for sensing when the tool holder and cutting tool have been advanced a predetermined distance toward and into weld region 30. While these means might comprise limit switches, or the like, which are positioned to be actuated by the tool or tool holder at predetermined vertical positions relative to rotating sleeve 58, the embodiment described relies on the use of hard stops and a clutch associated with motor 76 which will slip above a predetermined torque level. Accordingly, tool holder 82 is provided with an outwardly extending, upwardly facing stop surface 120 adapted to nonyieldingly contact the lower surface of the base portion of rotating sleeve 58 when the tool holder and cutting tool 88 are in a "withdrawn" or "start" position. The downwardly facing, lowermost surface of tool holder 82 comprises a second stop 122, in this instance facing downward. The vertical positioning of cutting tool 88 and accordingly cutting edge 116 and chamfering edge 118 relative to tool holder 82 is predetermined when mounting the tool in the tool holder such that stop surface 122 will nonyieldingly contact the surface of flange 26 when a tool holder 82 has been advanced a sufficient distance to complete both the cut and the chamfer in the seal region.

Figure 4:
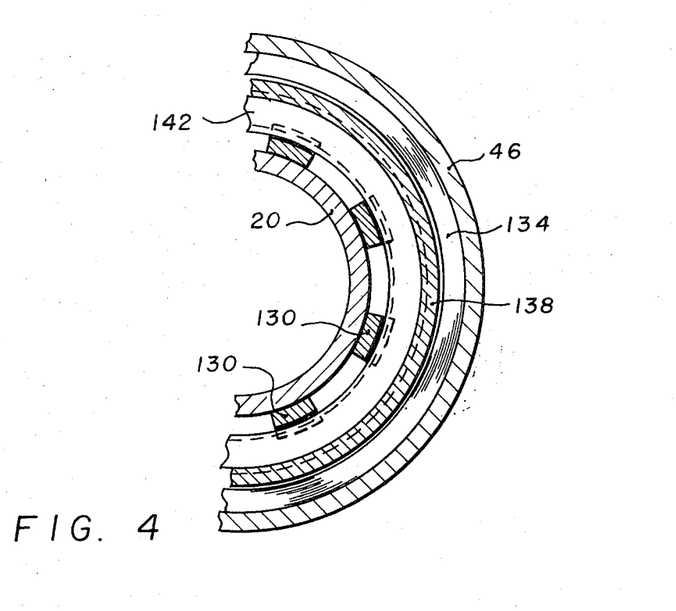
FIG. 4 is a plan view of the gripping mechanism as taken along line 4—4 of FIG. 2. parts being depicted in phantom.

As earlier mentioned, outer sleeve 46 of housing 36 is radially spaced from motor housing 20. This region is occupied by a remotely actuated mechanism for grippingly engaging the outer surface of motor housing 20 to prevent relative movement of cutting machine 32 either axially, radially, or rotationally relative to motor housing 20. This gripping mechanism comprises a gripping sleeve 124 radially inwardly spaced from the lower portion of outer sleeve 46 by inwardly extending annular support member 126 in close proximity to motor housing 20. Support member 126 is affixed at its outer circumference as by welding, to outer sleeve 46 and may be considered a part of housing 36. Gripping sleeve 124 is affixed to the support member 126 near its inner circumference, as by bolted engagement. Gripping sleeve 124 is in the form of a collet and includes an upper annular collar 128 continuously and closely, but slidably, encircling motor housing 20 and having a plurality of circumferentially spaced radially flexible gripping fingers 130 extending substantially vertically downwardly therefrom as seen in FIGS. 2 and 4. The radially innermost surfaces of sleeve 124 and support member 126 have nearly the same diameter as motor housing 20 to radially position housing 36 relative to the motor housing. The radially outward surface of each finger is contoured such that it extends downwardly and outwardly from collar 128 for a distance below said collar and, most importantly, below that extends downwardly and inwardly. This outwardly facing contoured surface of fingers 130 serve as a cam following surface for at least one vertically movable cam member which encircles the fingers. Fingers 130 may be chamfered at their lower ends about their inwardly facing surface to facilitate relative insertion of motor housing 20.

In the described embodiment, the vertically movable cam member is an annular slug or armature 132 adapted to be controllably moved vertically along the lower portion of said fingers 130 and including a radially inward facing surface which is inclined downwardly and inwardly and is in sliding contact with the downwardly and inwardly extending outer surface of fingers 130. Slug 132 is vertically moved by either coil 134 or coil 136 in a manner well known in the art of linear motors as employed, for instance, in magnetic jacking mechanisms for nuclear control rods. These coils are also powered and controlled by cable 80. A cylindrical housing member 138 closely encircles slug 132 and extends vertically between and is supported by support member 126 at the top and support member 140 extending inwardly from outer sleeve 46 at the bottom. Coils 134 and 136 occupy an annular region intermediate housing member 138 and outer sleeve 46 in vertically displaced relationship. An annular pole piece 142, non-moving in this embodiment, is interposed intermediate housing member 138 and the outer surface of fingers 130 above slug 132. Further, a lower pole piece 144 which may be a part of support member 140 occupies part of the region below slug 132 intermediate fingers 130 and housing member 138.

When coil 134 is energized, a working magnetic field is created between pole 142 and slug 138. This field causes slug 132 to move upwardly toward pole 142, thus urging fingers 130 radially inward tightly against the outer surface of housing 20. When coil 136 is energized and coil 134 de-energized, a working magnetic field is created between pole 144 and slug 132 which causes slug 132 to move downward toward pole 144, thereby removing the inwardly directed forces on fingers 130 to permit sliding movement between gripping sleeve 124 and housing 20. Sleeve 124 and fingers 130 thereof thus serve to fixedly position the cutting machine radially of housing 20 and radially inward compression of the fingers locks the machine in place.

While an embodiment has been described employing two separate coils, one for lifting and one for lowering a single movable slug, it will be appreciated that a single coil might be employed and biasing means such as a spring acting on the slug would replace the function of the second coil.

Alternatively, the cam member might be connected with the piston of a fluid actuated piston and cylinder combination. The piston and cylinder would be supported and oriented to move the cam member in substantially the same manner and direction as do the coils 134 and 136 of the described embodiment. If the cam member were pneumatically or hydraulically actuated, there would be no need to include pole piece 142 either.

Several openings 146, preferably three or more, are uniformly spaced about and extend through the circumference of outer sleeve 46 and are located at longitudinally, or vertically, about the same position as lower end of locating sleeve 44. Openings 146 provide ports through which air or possibly some other fluid may flow to cleanse the cut area.

Outlet nozzles 148, joined to the outer surface of outer sleeve 46 and encircling openings 146 serve to connect the interior of housing 36 with a manifold 150 which is here shown encircling housing 36. A plurality of holes 152, possibly ten or more, extend through locating sleeve 44 about its circumference at or near its base to provide air or fluid communication between openings 146 and the narrow annular region between housing 22 and sleeve 44. Remotely located vacuum drawing means may be connected to manifold 150 by means of a hose 154, seen in FIG. 1. The reduced pressure thus appearing at openings 146 cause an air flow downwardly between housing 22 and locating sleeve 44, through holes 152, across the region of weld 30 being cut and out through openings 146. This air flow generally removes cutting chips from the area of cutting operation.

Referring now to the operation of cutting machine 32, operator 40, through control of winch and cable 38, lowers the cutting machine about upper pressure housing 22 until locating sleeve 44 contacts flange 26 in the area of weld 30. At this point machine housing 36 will be in its correct operating positioning for performing the necessary cut. Coil 134 will be energized, moving slug 132 upward, thereby forcing fingers 130 of gripper 124 grippingly against motor housing 20 to retain cutting machine 32 in position. Motor 76 will previously have been reversed to move tool holder 82 to its "starting" or "reference" position in which its stop surface 120 contacts rotating sleeve 58.

To begin the cutting operation motor 76 is energized in the forward direction which results in rotation of rotating sleeve 58, and accordingly cutting tool 88, relative to machine housing 36. Cutting tool 88 will describe a circular path initially positioned directly above weld 30 and having its center on the axis of pressure housings 20 and 22. As rotating sleeve 58 turns relative to ring gear 106, the several gears supported on the rotating sleeve and ultimately in engagement with ring gear 106 will be forced to rotate on their axes, resulting in rotation of feed gear 96 to advance tool holder 82, and accordingly cutting tool 88, downwardly into cutting engagement with seal weld 30. Cutting edge 116 contacts and cuts weld 30 to a depth which increases with each revolution. This continues until it is completely through the weld, at which point chamfering edge 118 will have begun to chamfer the surface of motor housing 20. Penetration of cutting tool 88 continues until stop surface 122 non-yieldingly contacts the surface of flange 26. The increased resistance to movement is transmitted back through the various gear trains to a clutch positioned intermediate the gears and motor 76. The clutch, designed to slip for increased torques of this magnitude, effectively disconnects the motor from the gear drive train and further downward movement of the cutting tool stops. The region of the cut, meanwhile, is continuously being swept with air to remove the cutting chips.

At this point the cutting and chamfering operations are completed and cutting tool 88 is preferably withdrawn by reversing motor 76 until tool holder 82 returns to its "starting" position. Coil 134 is then de-energized and coil 136 energized to move slug 132 downward, thereby terminating the gripping action of gripper 124 on housing 20. Cutting machine 32 may then be winched upward and removed from about housing 22.

As weld seal 30 has now been severed, upper pressure housing 22 may be removed from the threaded engagement with motor housing 20. The chamfered surface of motor housing 20 prepares it for re-sealing and welding when housing 22 is later rethreaded thereinto.

Figures 5, 6:
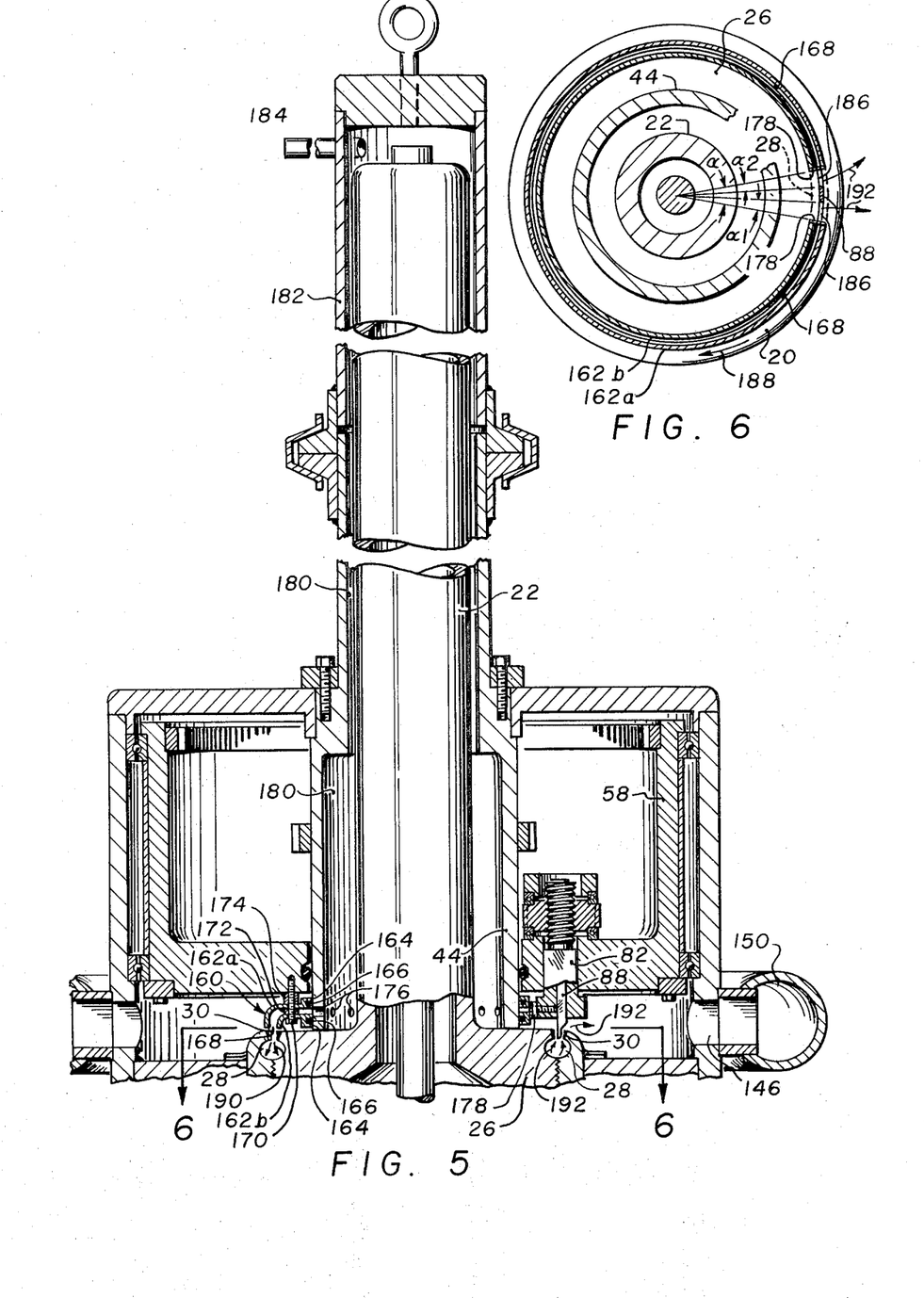
FIG. 5 is a view similar to FIG. 2 and simplified somewhat, showing alternate means for effectively preventing cutting chips from entering the annular seal void.
FIG. 6 is a plan view of the cleansing means as seen along line 6—6 of FIG. 5.

Referring to FIGS. 5 and 6, there is shown alternative means for cleansing the cut region of cutting chips. While the flow of air or other fluid across the cut region, as earlier described, is generally sufficient to remove most cutting chips from the general region of the cut, it may not prevent chips from entering the annular void of omega seal 28 when the cutting tool 88 cuts through weld 30 and penetrates the void. These chips are capable of entering the thread region and interfering with the proper rethreading or sealing of housing 22 with housing 20, when they are later re-engaged. Accordingly, it is desirable to prevent chips from entering the chamber of seal 28 to the greatest extent possible.

A fluid nozzle 160 is provided which directs a fluid stream, preferably of air, onto the cutting region and more importantly, into the chamber of seal 28 when tool 88 has penetrated the region. Nozzle 160 comprises a pair of spaced inverted rigid cup-like members 162a and 162b, each of which is downwardly turned around its outer circumference. Both cup-like members 162a and 162b are generally arcuate in form, having a large arcuate central opening extending axially therethrough. This opening is slightly greater in diameter than the outer diameter of locating sleeve 44 which extends therethrough. The inner arc circumference of each cup-like member 162a and b is provided with a radially inward facing seal seat 164, in which is seated and retained a generally arcuate seal 166. Each seal 166 is comprised of a resilient material, such as rubber, and is of sufficient radial thickness to be urged by seat 164 into substantially air-tight sealing relationship with locating sleeve 44. Seal 166 allows relative rotational motion between the cup-like members 162a and b and locating sleeve 44.

The diameter of cup-like member 162a is somewhat greater than that of member 162b and it is spaced above and radially outward of member 162b. The downwardly turned lips on one, or both, of members 162a and b may be inclined somewhat toward the other in a convergent manner to form a generally arcuate orifice 168 at the downstream or outlet end of nozzle 160. The width of orifice 168 is quite narrow on the order of 0.010 inch. Members 162a and b are maintained in their described spaced relationship with one another by a plurality of spacing supports which each include a bolt 170 extending upwardly through the members and into threaded engagement with rotating sleeve 58. Each bolt 170 includes an inner spacer 172 around the bolt between members 162a and b for maintaining a minimum spacing therebetween to obtain the required orifice width and an outer spacer 174 similar to spacer 172 extending between member 162a and sleeve 58 for urging member 162a into contact with spacer 172.

Nozzle 160 is thus rigidly mounted to rotating sleeve 158 therebelow and rotates therewith. The diameters of members 162a and 162b are each such that orifice 168 is aligned in the axial direction with seal weld 30 and bolt 170 and spacers 172 and 174 are of such length that the orifice 168 of nozzle 160 is in close proximity with the weld 30. A plurality of openings 176 extend radially through locating sleeve 44 about its circumference near the lower end and the inner circumference of the nozzle 160 is positioned along the sleeve 44 to be in registry with the openings. Openings 176 are of about the same diameter as the spacing between adjacent members 162a and 162b of the nozzle thereat.

Nozzle 160 has been described as comprising a pair of generally arcuate members 162a and 162b. In fact, both members 162a and b and thus nozzle 160, describe a nearly complete circle, having a discontinuous arc portion of some 15–25 degrees. This discontinuous arc portion is large enough to accommodate tool holder 82 and allow it to be reciprocated in the axial direction relative to nozzle 160. A pair of end covers 178, seen in FIG. 6, are sealingly affixed across the ends of members 162a and b at the opposite ends of the arc described thereby, to complete nozzle 160. Nozzle 160 thus may receive a source of pressurized air through the openings 176 and discharge it downwardly through the thin arcuate orifice 168. The inner circumference of nozzle 160 has been described as an arc of less than 360°, however it might be circular to continuously encompass all of the openings 176 at all rotational positions, and the discontinuous arc portion of the nozzle would exist only radially outward thereof.

A fluid, such as air, is delivered under pressure to nozzle 160 through openings 176 from an annular conduit 180. Conduit 180 is formed by the annular void between upper housing 22 and locating sleeve 44. Conduit 180 may be continued upwardly beyond locating sleeve 44 by tubular sleeve 182 which is sealingly joined to sleeve 44 and extends upwardly therefrom beyond the upper end of housing 22. Sleeve 182 may be of metal, rubber, plastic or the like and may be of sufficient tensile strength to raise and lower the machine 32 about housing 22. Sleeve 182 may readily be disconnected from machine 32 for transport and storage. Air may be introduced to conduit 180 from a conduit 184 connected at one end thereto and at the other end to a source of pressurized air, not shown. The air will be supplied at the relatively low pressure of 10–20 psi, but may be varied as required. The contact surfaces between locating sleeve 44 and the upper surface of flange 26 of housing 22 are sufficiently smooth to provide a fairly good seal to conduit 180 at its lower end.

FIG. 5 depicts cutting tool 88 as having penetrated through annular seal weld 30 and into the annular chamber of seal 28, leaving a thin annular cut void 186, seen best in FIG. 6. As mentioned, nozzle orifice 168 and cut 186, and accordingly cutting tool 88, have substantially the same radius about the axes of housings 20 and 22. That arc portion of a circle through which nozzle 160 is discontinuous is indicated generally as $\alpha$ in FIG. 6. Cutting tool 88 extends along a part of arc $\alpha$ near the angular center thereof with remaining portions of arc $\alpha$ forward and rearward thereof. Typically, arc $\alpha$ at the radius of orifice 168 is about an inch in length with cutting tool 88 occupying less than one-half of that length and the remaining arc portions thereof being generally exposed and indicated as $\alpha_1$ and $\alpha_2$.

As cutting tool 88 and nozzle 160 orbit about the axes of housings 20 and 22 in the direction indicated by arrow 188 the arc segments $\alpha_1$ and $\alpha_2$ obviously move along cut 186 relative thereto in a recurring circular or orbital path.

Referring now to the operation of nozzle 160 in preventing substantially any cutting chips from entering, or at least remaining in, seal void 28, it will be seen in FIG. 5 that a jet of air indicated by arrows 190 is directed downwardly from the nozzle orifice 168 and into the annular chamber of seal 28 against a facing wall thereof when a cut 186 extends through weld 30. This introduction of pressurized air into the chamber of seal 28 results in the creation of a pressure differential between the seal chamber and the region within machine housing 36 external thereto.

Air may be exhausted from housing 36 either through natural leaks in housing 36 or throuh ports to the atmosphere or, as described with reference to FIG. 1, under the additional influence of vacuum drawing means. In any event, the pressure within the chamber of seal 28 is greater than that immediately outside thereof and results in a flow of air, indicated by arrows 192, upwardly and out of the chamber, through cut 186. This exhaust flow of air from the chamber of seal 28 may occur only where arc $\alpha$ and more particularly $\alpha_1$ and $\alpha_2$ are positioned at the moment, as these are the only regions at which the downward jet from nozzle 160 are not then occurring and are not blocked by cutting tool 88. As nozzle 160 moves relative to cut 186, so too will the exhaust regions of $\alpha_1$ and $\alpha_2$.

The pressure of the resulting flow of air indicated by arrows 192 is sufficient to prevent chips, resulting from the cutting and/or chamfering functions of tool 88, from entering the annular chamber of seal 28. While some very small quantity of chips may enter seal 28 when tool 88 first penetrates it and before the air jet from nozzle 160 is able to enter the seal chamber, the quantity of chips is quite small and they are generally removed through subsequent turbulence of the air flow thereat when an arc segment $\alpha_1$ or $\alpha_2$ appears thereover on subsequent revolutions of the nozzle. In this manner chips are prevented from entering seal 28 and are swept away from the cut region by the air stream. Some or most of the chips may be exhausted from the housing 36 while the remainder may collect therein away from cut 186 and will be discharged when the machine 32 is removed.

It will be apreciated that while the orifice 168 of nozzle 160 is shown as a single continuous arc, it might be a plurality of shorter segments. However, it is important that a short arcuate segment $\alpha_1$ or $\alpha_2$ or both exist in which orifice 186 is absent in front and/or in back of cutting tool 88 to allow exhaust of the air jet introduced to the seal 28 from nozzle 160. These exhaust regions, $\alpha_1$ and/or $\alpha_2$, are near the cutting tool to insure that the chips are removed as they are created.

While in the preferred embodiment the tool holder and cutting tool have been described in a vertically movable orientation, it will be realized that they might also be positioned to move radially relative to the rotating sleeve to make a cut in or through the outer circumference of some pressure housing member.

It will be understood that the embodiment shown and described herein is merely illustrative and that changes may be made without departing from the scope of the invention as claimed.

What is claimed is:

1. Apparatus for cutting an annular seal weld in a transverse portion of an elongated member, which transverse portion connects an elongated longitudinally outer tubular portion of the member with a longitudinally inner tubular portion of the member and in which the lateral operating space about the member is limited, comprising:

a. a housing constructed to slidably encircle a said member for movement longitudinally inward therealong toward said longitudinally inner tubular portion and including means supported therewith for self-aligning said housing in a predetermined operating positioning proximate said annular seal weld;

b. means for maintaining said housing in said predetermined positioning;

c. a sleeve supported by said housing in relative rotational relationship therewith and against longitudinal motion relative thereto and constructed to rotatably encircle said longitudinally outer tubular portion, said sleeve including a longitudinally extending portion having a ring gear about the perimeter thereof;

d. remotely controlled driving means including a motor supported by said housing and drivingly connected to gear means rotatably supported by said housing in driving engagement with said rotating sleeve ring gear for rotating said sleeve relative to said housing;

e. a cutting tool fixedly positioned in a tool holder, said tool holder having a longitudinally extending threaded portion and being laterally supported by said rotating sleeve in longitudinally sliding relationship therewith;

f. means for supporting said cutting tool and tool holder in longitudinally movable cutting alignment with said annular seal weld including first gear means having a threaded portion extending therealong and being rotatably supported by said rotating sleeve in supportive threaded engagement with said tool holder; and g. means for moving said cutting tool into cutting engagement with said weld including second gear means driving said first gear means and including a ring gear nonrotatably supported by said housing, whereby rotation of said rotating sleeve relative to said housing results in rotation of said first gear means and movement of said tool holder and tool longitudinally of said housing.

2. The apparatus of claim 1 wherein said second gear means comprise a planetary gear train having said ring gear non-rotatably supported by said housing — the sun gear and including additional planetary gear means rotatably supported by and carried with said rotating sleeve.

3. The apparatus of claim 1 wherein said cutting tool includes a first cutting surface for making a first cut in said seal weld and a second cutting surface for chamfering at least part of the surface exposed by said first cut.

4. Apparatus for cutting through the annular seal weld of an annular omega seal connecting a first tubular member with a second tubular member, said omega seal including an annular chamber defined by structure of said first and second tubular members and underlying said weld, said apparatus comprising:

a. a housing constructed to slidably encircle at least the first of said tubular members for movement therealong toward said second tubular member and including means supported therewith for aligning said housing in a predetermined operating position proximate the region of said intended annular cut;

b. a sleeve supported by said housing in relative rotational relationship therewith and against longitudinal motion relative thereto and constructed to rotatably encircle said first tubular member;
c. remotely controlled driving means for rotating said sleeve relative to said housing;
d. cutting means;
e. means supporting said cutting means on said rotating sleeve in cutting alignment with said region of intended annular cut when said housing is at said predetermined positioning, said means adapted to be moved toward said weld relative to said rotating sleeve;
f. means for moving said cutting means into cutting engagement with said weld to make an annular cut therethrough; and
g. means carried by said rotating sleeve for directing a stream of pressurized fluid through said cut against a facing wall of said chamber only along an arc portion of said cut angularly spaced from said cutting tool, whereby to create a stream of fluid exiting said seal chamber through said cut proximate said cutting tool.

5. The apparatus of claim 4 wherein said fluid stream directing means comprise a nozzle operatively connected at its upstream end to a source of pressurized fluid and having a narrow arcuate discharge orifice at its downstream end in registry with said cut.

6. The apparatus of claim 5 wherein said arcuate orifice extends the substantial portion of a circle to near said cutting tool.

* * * * *